United States Patent [19]
Williams

[11] 3,852,480
[45] Dec. 3, 1974

[54] BLAND SOY PROTEIN
[75] Inventor: Wilmore Williams, Chicago, Ill.
[73] Assignee: Beatrice Foods Co., Chicago, Ill.
[22] Filed: Apr. 11, 1972
[21] Appl. No.: 243,079

[52] U.S. Cl................ 426/46, 426/23, 426/148, 426/212
[51] Int. Cl. .............................................. A23j 3/00
[58] Field of Search ............... 99/17, 98, 99; 426/46, 426/148, 212

[56] References Cited
UNITED STATES PATENTS
3,585,047  6/1971  Fujimaki et al.................... 99/98
3,694,221  9/1972  Hoer et al............................. 99/17

Primary Examiner—James R. Hoffman
Attorney, Agent, or Firm—Cushman, Darby & Cushman

[57] ABSTRACT

Bland soy protein is produced by suspending soy protein in a fluid medium and adjusting the pH thereof to between 1.5 and 4.0. An Acid Fungal Protease is added to the acidified suspension and allowed to act on the suspension at temperatures up to 55°C. The protein becomes bland and is spray dried to a powder.

10 Claims, No Drawings

BLAND SOY PROTEIN

The present invention relates to a method of producing a bland soy protein and to the product produced thereby.

It is well known that soy protein is an excellent source of nutritional protein for animal, including human, consumption. In certain parts of the world, soybean protein has traditionally been one of the major sources of protein. Thus, in the Orient various food products are made by treating soy protein in a manner to render the protein relatively palatable under the conditions of consumption, e.g., the use of soybeans for producing soy sauce and bean curds. However, in the style of preparing food according to European and American standards, the protein derived from soybeans has an objectionable odor and taste, which has severely limited the use of soy protein in those foods. Therefore, soy protein has been used in either very small amounts or in foods where the objectionable odor and taste can be heavily masked.

It would, of course, be most desirable to prepare a bland soy protein in order that this important source of nutritional protein could be more extensively utilized in foods for human consumption. Accordingly, it is an object of the invention to provide a method of treating soy protein to render the protein essentially odorless and tasteless, i.e., a bland soy protein product. It is a further object to provide a bland soy protein. It is yet another object to provide food compositions containing relatively high proportions of bland soy protein. Other objects will be apparent from the following disclosure and claims.

It has now been discovered that soy protein can be treated with certain enzymes in a manner which will essentially remove all objectionable odor and flavor from the soy protein and thereby produce an essentially bland soy protein. The success of the invention depends upon the use of particular enzymes and the use of a particular method of employing those enzymes in treating soy protein. The enzymes useful in the present invention are the Acid Fungal Protease enzymes derived from an Aspergillus organism and especially *A. oryzae*.

While any form of soy protein may be used with the present invention, including soybeans themselves, or any protein fraction of the soybeans, it is for obvious reasons far more convenient to use a relatively purified form of soy protein. Thus, commercial soy protein which is at least about 75% pure, especially at least about 85% pure, e.g., 90% pure or greater, is preferred as the starting source of soy protein. The soy protein is suspended in a liquid, preferably an aqueous liquid, in order that it may be rapidly stirred during treatment with the enzyme. Water is the preferred aqueous medium for the suspension and the soy protein content may be as little as 1% and up to about 30% by weight of the liquid medium. A preferred suspension content is between 8% and 20%, e.g., about 10% to 15% of soy protein by weight of the liquid. The suspension is then adjusted to a pH of between 1.5 and 4, especially between 2.5 and 3, e.g., 2.8. It is most important that the enzyme be used in this relatively narrow pH range, since otherwise the product which results will not have the exceptional characteristics of the present invention. The pH may be adjusted by any desired means, especially with the use of any edible food grade acid such as the mineral acids, e.g., hydrochloric acid, sulphuric acid and food grade organic acids such as acetic and lactic acid, etc.

The temperature of the suspension with the pH adjusted is controlled at about 20° to 55°C, although it is preferred that the upper portion of this range be used since best results with the present enzyme are accomplished thereby. Thus, temperatures of at least 40° and especially at least 45°, e.g., 50° to 55°C are used with the present process. After the temperature has been adjusted within the foregoing ranges, the enzyme may then be added.

The amount of enzyme added to the suspension is not narrowly critical, since the amount of enzyme, mainly, affects only the time required to accomplish the present desired results. Thus, as little as 0.1% of enzyme per unit weight of soy protein may be utilized, but the time required with such small amount of enzyme to produce the present bland soy protein is quite long. Accordingly, it is preferred that at least 1% by weight of enzyme per unit weight of soy protein be used, and especially about 2% by weight is a preferred amount. Likewise, there is no essential upper limit of the amount of enzyme which may be utilized, but amounts greater than 30% by weight of enzyme per unit weight of protein add essentially no speed to the desired reaction. Thus, amounts less than 20%, especially less than 10% e.g., less than 5% are preferred.

After the enzyme has been introduced into the suspension, the enzyme is allowed to work on the soy protein and the temperatures are maintained in the above-noted ranges. While stirring is not required, it is preferred that some gentle agitation take place in order to assure uniformity of temperatures and enzyme action. During the process of treating with the enzyme, the enzyme will digest portions of the soy protein to break up peptides and produce the resulting bland product. The time required for this peptization will vary with the amount of protein originally suspended in the aqueous solution, the amount of enzyme placed in the suspension and the temperature at which the enzyme is allowed to act upon the protein. However, the process will require at least 10 minutes in order to provide any reasonable amount of odor and taste mitigation and times of at least 15 to 20 minutes should be expected. There is no essential upper limit on the amount of time at which the process may be carried out, since the enzyme will effectively remove the objectionable odor and portions of the soy protein and thereafter will not adversely affect the bland nature of the soy protein. However, times of less than 10 days, especially less than 5 days or 1 day are preferred. Actually, the process, generally, can be carried out in times of less than 1 hour, especially less than 45 minutes. In any circumstances, one may simply taste the suspension as the enzymes proceed to act thereon and when the suspension becomes essentially bland or tasteless, then it can be determined that the end point of the enzymatic reaction has been reached.

When sufficient action of the enzyme has taken place, it is preferred that the enzyme be deactivated by heating to an elevated temperature. Temperatures above 55°C for at least 10 minutes are sufficient for this purpose, but it is preferred that higher temperatures be used, especially temperatures of at least 60°C. For example, a temperature of about 70°C for 10 to 30 minutes will insure that the enzymes have been deactivated and that no further enzymatic reaction will take place.

Either before or after deactivation of the enzyme, but in any case, after the end point discussed above has been reached, the suspension is again adjusted in pH to close to neutral, e.g. between about 6 and 8, especially about 7. The pH can be adjusted with any food grade base, such as an alkaline earth or alkaline metal hydroxide, especially sodium hydroxide. However, the particular base utilized for neutralizing the suspension is not critical and any desired base, so long as it is a food grade base, may be used.

The suspension produced by the foregoing process is then ready for any desired use in connection with incorporation into a foodstuff. Thus, the suspension may be used for direct application to foodstuffs containing a liquid or which are prepared with the use of a liquid e.g., breads, soups, pastries, cakes, etc. However, for convenience sake, it is preferred that the suspension be dried and that the dried bland soy protein be then utilized as desired.

The drying may take place in any conventional apparatus, including a vacuum pan dryer, oven dryer, porous membrane, tumble dryer, tray dryer, but spray drying is particularly convenient. Thus, the suspension may be spray dried in a conventional spray dryer at conventional temperatures, e.g., an inlet temperature of about 310°F to 400°F, e.g., 350°F and an outlet temperature of about 160°F to 212°F, e.g., 180°F, to provide a spray dried free-flowing powder.

The resulting dried powder is soluble in water up to about 10% by weight. Thus, the present bland soy protein may be redissolved in any aqueous medium of up to about 10% or more by weight for subsequent ease of application to the specific food product desired. Alternately, a suspension may be made or the bland protein may be incorporated in the dry form into any food product, as desired.

The invention will be illustrated by the following examples, but it is to be understood that the invention is not limited thereto, but is fully applicable to the foregoing disclosure.

EXAMPLE 1

Commercial soy protein which is about 90% pure was added to water in an amount of about 10% by weight. A suspension was prepared by stirring and the suspension had the characteristic odor and taste of soy protein. Hydrochloric acid was added to the suspension with stirring until the pH was adjusted to approximately 2.8. Thereafter, the suspension was heated to approximately 50°C and an Acid Fungal Protease derived from the *Aspergillus oryzae* species-31,000 hemoglobin units/gm (Marschall Division of Miles Lab., Inc.) was added in amount of 2% by weight of the soy protein of the suspension. The suspension with the enzyme added was allowed to react with stirring for 35 minutes. At the end of that time, there was no remaining characteristic odor or taste of soy protein. The suspension was then heated to approximately 70°C for about 20 minutes to deactivate the enzyme. To the deactivated suspension was added sodium hydroxide to adjust the pH to approximately 7. The neutralized suspension was then spray dried in a conventional spray-drying chamber with an inlet temperature of 350°F and an outlet temperature of 180°F. The resulting spray-dried powder had a solubility in water of approximately 10% and had no characteristic odor or taste of soy protein either in the powdered or dissolved form.

EXAMPLE 2

The powder of Example 1 was dissolved in milk to make a 5% solution of the powder in the milk. The milk was then used to make bread with a conventional flour, yeast, salt, shortening and milk recipe. The resulting bread had no objectionable odor or taste of soy protein, but was high in nutritional protein value.

EXAMPLE 3

A clear chicken broth of relatively low protein value was heated to approximately 160°F and the powder of Example 1 was dissolved therein, with stirring, until the powder content of the soup was approximately 7% by weight. The resulting soup had none of the characteristic odor or taste of soy protein, but was high in nutritional soy protein value.

EXAMPLE 4

Conventional powdered milk was mixed with 7% by weight of the powder of Example 1. The resulting powdered milk was mixed with water in reconstitution proportions and the reconstituted milk had none of the objectionable odor and taste of soy protein, but was high in soy protein nutritional value.

From the above, it is seen that the present invention provides the method for producing a bland soy protein and that the bland soy protein may be used, as desired, to upgrade the protein content of conventional foodstuffs. However, various changes from the detailed description will be apparent to those skilled in the art. For example, instead of leaving the enzyme in the bland protein, a bound enzyme may be used in the method and the bound enzyme removed by conventional means. Likewise, any conventional foodstuff may be upgraded in protein value by use of the present bland protein, and the particular foodstuffs are not critical. Further, any food grade suspension liquid which does not adversely affect the enzyme may be used, and any Acid Fungal Protease enzyme is operable in the present method. Likewise, the method is not limited to commercial soy protein or commercial Acid Fungal Protease.

It will also be apparent that the bland nature of the soy protein is a result of the action of the Acid Fungal Protease. The protease biologically alters the soy protein in such a manner that the objectionable odor and flavor components thereof are removed.

What I claim is:

1. A method of producing a bland soy protein consisting essentially of suspending soy protein in an aqueous medium, adjusting the pH of the resulting suspension to between about 1.5 and 4.0, adding to the suspension an Acid Fungal Protease, allowing the Acid Fungal Protease to act on the suspension at temperatures of from 40°C up to about 55°C until a bland protein is produced, and essentially neutralizing the suspension to adjusting the pH to 6 to 8.

2. The method of claim 1 wherein the amount of soy protein suspended in the fluid medium is less than about 30% by weight of the fluid medium.

3. The method of claim 2 wherein the amount of soy protein suspended in the fluid medium is between about 1% and 20% by weight of the fluid medium.

4. The method of claim 1 wherein the aqueous medium is water.

5. The method of claim 1 wherein the amount of enzyme added to the suspension is between 1 and 30% by weight of the soy protein in the suspension.

6. The method of claim 5 wherein the neutralized suspension is dried.

7. The method of claim 6 wherein the suspension is spray dried.

8. The method of claim 1 wherein the suspension is adjusted to a pH of between 6 and 8, after the bland soy protein is produced.

9. A dried soy protein powder which is biologically altered by action of an exzyme consisting essentially of an Acid Fungal Protease enzyme.

10. A food composition containing a portion of the soy protein powder of claim 9.

* * * * *